United States Patent [19]

Rütschle et al.

[11] Patent Number: 5,582,066
[45] Date of Patent: Dec. 10, 1996

[54] MACHINE TOOL, IN PARTICULAR LONG-BED MACHINE TOOL

[75] Inventors: Eugen Rütschle, Mühlheim/Donau; Rudolf Haninger, Seitingen, both of Germany

[73] Assignee: Chiron-Werke GmbH & Co.KG, Germany

[21] Appl. No.: 248,345

[22] Filed: May 24, 1994

[30]  Foreign Application Priority Data

Jun. 16, 1993 [DE] Germany .......................... 43 19 905.4

[51] Int. Cl.⁶ ................ B23Q 5/40; B23Q 11/00
[52] U.S. Cl. ...................... 74/89.15; 74/424.8 R
[58] Field of Search ............ 74/89.15, 424.8 R; 269/73

[56]  References Cited

U.S. PATENT DOCUMENTS 4,030,137  6/1977  Dalziel ........................ 360/106 X
4,483,523  11/1984  Bredow .

FOREIGN PATENT DOCUMENTS 3139031  3/1983  Germany .
90 17 035 U  4/1991  Germany .
0127938  7/1985  Japan ......................... 74/89.15
0125749  6/1986  Japan .......................... 269/73
0072254  3/1990  Japan ......................... 74/89.15
0150538  6/1990  Japan ......................... 74/89.15

Primary Examiner—Richard M. Lorence
Assistant Examiner—Troy Grabow
Attorney, Agent, or Firm—Pretty, Schroeder, Brueggemann & Clark

[57]  ABSTRACT

A machine tool, in particular a long-bed machine tool, comprises a column (11) that can be displaced in at least a first axis (13), and at least one spindle (15) clamped rotatably at support points (22, 23) in the region of its two outer ends (20, 21). The spindle (15, 16) extends parallel to the first axis (13) and is joined to the column (11) in such a way that when the spindle (15) rotates, the column (11) is displaced in the first axis (13). A damping apparatus (28) acting on the spindle (15) between the support points (22, 23), which damps any vibrations of the spindle, is provided on the machine tool. The damping mechanism (28) is displaceable along the first axis (13) at least to some extent independently from the column (11).

12 Claims, 2 Drawing Sheets

MACHINE TOOL, IN PARTICULAR LONG-BED MACHINE TOOL

BACKGROUND OF THE INVENTION

1. Field of the Invention

The present invention relates to a machine tool, in particular a long-bed machine tool, with a column that can be displaced in at least a first axis, and with at least one spindle, clamped rotatably at support points in the region of its two outer ends, that extends parallel to the first axis and is joined to the column in such a way that when the spindle rotates, the column is displaced in the first axis.

2. Description of the Related Art

It is repeatedly observed with machine tools of this kind that at very high traverse speeds or with long-bed machine tools in which the clamped length of the spindle is very great, the spindle tends to vibrate undesirably.

These vibrations not only put an upper limit on the manageable traverse speed and bed length, but also lead to premature material fatigue and possibly to failure of the machine tool in question. Furthermore, these vibrations impair the processing accuracy of the machine tool, since under such operating speeds conditions the column can no longer be displaced accurately at high speed over longer distances.

It is known that the critical rotation speed at which shafts begin to vibrate depends on the protruding length and the diameter of the shaft. Although the critical speed can be increased by reducing the clamped free length or by increasing the diameter, this leads either to an undesirably high spindle weight or to insufficient bed length. When the spindle diameter is increased, in particular, another consideration is that the deflection due to its own weight is in itself sufficient to provoke the undesirable spindle vibration. Moreover, these vibrations can build up to the point that considerable damage can be done to the machine tool.

On this basis, the object of the present invention is to develop a machine tool of the aforesaid type in such a way that high traverse speeds can be achieved and/or long bed lengths are possible with long-bed machine tools. The new machine tool is intended to be of very simple design.

German patent DE-C-31 39 031 discloses a machine tool with a displaceable workpiece table and a driving spindle therefore which is provided with a damping apparatus acting on the spindle between support points thereof to damp vibrations of the driving spindle. The damping apparatus comprises two auxiliary bearings in the longitudinal direction of the spindle slidingly supported by the workpiece table. The auxiliary bearings are each provided at opposite ends of the workpiece table between same and a respective support point of the spindle.

This construction is expensive and complicated and has the further disadvantages that the known damping apparatus can not be retrofitted to existing machine tools and narrows the travelling distance of the workpiece table undesirably.

A further, also very complicated damping apparatus for a driving spindle of a machine tool is known from German utility model DE 90 17 035. This apparatus comprises a fixed support groove encircling the spindle from below to about 70% of the circumference thereof and extending along almost all of the length of the driving spindle.

This damping mechanism also has the disadvantages mentioned above, i.e. it can not be retrofitted to existing machine tools.

In view of this it is an object of the present invention to provide a machine tool of the kind mentioned at the outset which is of very simple design, whereby it is intended that the damping apparatus may be retrofitted to existing machine tools.

SUMMARY OF THE INVENTION

According to the invention, this object is achieved in a machine tool of the aforesaid type by the fact that a damping apparatus acting on the spindle between the support points and being displaceable along the spindle at least to some extent independently from the column, is provided.

The underlying object of the invention is completely achieved in this manner. Specifically, the applicant has found that additional damping of the spindle between the support points is all that is required to allow greater bed lengths and/or higher traverse speeds, with no change in spindle diameter. Moreover, the additional damping apparatus has the advantage that it is easier to adapt to new conditions, which is not possible with changes in the geometry of the spindle itself (increased diameter).

Moreover, the new damping apparatus can also be retrofitted to existing machine tools.

The fact that the damping apparatus can be displaced along the spindle is advantageous in that the damping apparatus does not influence the displaceability of the column. Specifically, with machine tools of this kind the spindle is often completely enclosed by a nut fastened on the column, so that an additional stationary support for the spindle either would greatly reduce the travel of the column or would need to be installed so close to a support point that it would be practically ineffective. Because the damping apparatus is displaceable, it can now travel along with the column although it is not fastened to it. In addition, provision can also be made for the damping apparatus to be driven in a different manner, and displaced in each case out of the current displacement range of the column.

It is further preferred if, in a machine tool in which the spindle is joined to the column by means of a nut element fastened onto the column, the damping apparatus acts on the spindle on both sides of the nut element.

This feature is advantageous in that an even more considerably better damping effect is achieved, since, for example, two supports are provided. This feature is also advantageous, however, if the column has assumed one of its extreme positions at one of the outer ends of the spindle, since then at least one support is still acting on the large protruding length between the distant support point and the nut element.

It is also preferred if the damping apparatus possesses at least one bearing element surrounding the spindle.

This feature advantageously produces very good damping, which acts considerably better than a simple additional reinforcement or other support for the spindle. This bearing element can be, for example, a ball bearing with inner ring, on which, if applicable, threads can also be provided so that the bearing element rotates along with the spindle.

In a development, it is preferred here if the bearing element is axially and radially movable with respect to the spindle.

It is advantageous here that the rotation of the spindle itself influences the position of the bearing element very little or not at all, so that with very rapid and short movements of the column, the position of the damping apparatus remains almost unchanged.

It is then preferred if the damping apparatus can be brought at least temporarily into contact with the traveling column by means of at least one stop.

It is advantageous here that the column drags the damping apparatus along, so to speak, as it moves, so that an extra drive does not need to be provided for the damping apparatus in order to move it away from the current displacement range of the column. Moreover, it is also not necessary to fasten the damping apparatus to the column itself, so that jamming cannot occur here.

It is generally preferable if the damping apparatus possesses at least two bearing elements that are spaced apart along the first axis and joined to one another by a spacer.

It is advantageous here that provision is made for highly uniform damping of the spindle when the column is in a wide variety of operating positions. Specifically, if the first bearing element is dragged along by the column, the second spacer is also pulled along by means of the spacer, which can, for example, take the form of a rod. By selecting an appropriate length for the distance between the two bearing elements, it is thus always possible to achieve damping that is well distributed along the first axis.

It is preferred in this context if the damping apparatus is guided, displaceably along the first axis, on a guide apparatus running parallel to the spindle.

It is advantageous here that because of the additional guidance of the damping apparatus, jamming thereof is now impossible even if the spindle exerts substantial transverse forces on the damping apparatus. It would certainly be possible to damp the spindle by arranging on it two bearing elements, spaced apart by a rod, for example, that span a preselected length of the spindle in the manner of a parallel connection and couple to one another; this can, however, lead to jamming, which is now prevented by the additional guidance.

In a development, it is then preferred if the damping apparatus is guided on the guide apparatus in such a way that forces exerted by the spindle on the damping apparatus and oriented substantially transverse to the first axis are absorbed by the guide apparatus.

It is advantageous here that undesired vibrations are damped very efficiently. Specifically, the vibrations are damped by the fact that the spindle is, in a manner of speaking, additionally mounted and clamped transverse to the first axis, but the spindle does not need to apply additional forces to displace the damping apparatus, for example when the aforementioned stops are provided.

It is particularly preferable here if the two bearing elements are held by the spacer at a distance from one another that is approximately equal to half the displacement travel of the column in the first axis.

It is advantageous here that this produces very favorable damping of the spindle, specifically because if a bearing element has been pushed all the way out by the column, the other bearing element is approximately in the center, providing favorable damping of the spindle.

It is generally preferred if the bearing element comprises at least one ball bearing whose inner cup can be dismantled.

The advantage of this feature is that a lifetime-lubricated ball bearing can be used, allowing for radial motion between bearing element and spindle. The wear occurring as a result of axial shifting of these parts then affects only the inner cup, which however can be replaced, for example at a recessed area of the spindle, without requiring complete disassembly.

It is further preferred in this context if the inner cup possesses a two-part plastic inner ring.

A two-part plastic inner ring of this kind, which can, for example, be snapped into the ball bearing, is particularly easy to replace at the aforesaid recessed area. Moreover, the frictional characteristics of this kind of plastic inner ring are particularly suitable for the selected purposes, so that despite the large forces that may be transferred from the spindle to the plastic inner ring, the latter does not run hot and is not excessively worn away.

Further advantages are evident from the description and the attached drawings.

It is understood that the features mentioned above and those yet to be explained below can be used not only in the respective combinations indicated, but also in other combinations or in isolation, without leaving the context of the present invention.

An exemplary embodiment of the invention is depicted in the drawings and will be explained further in the description below.

DETAILED DESCRIPTION OF THE INVENTION

Figure 1:
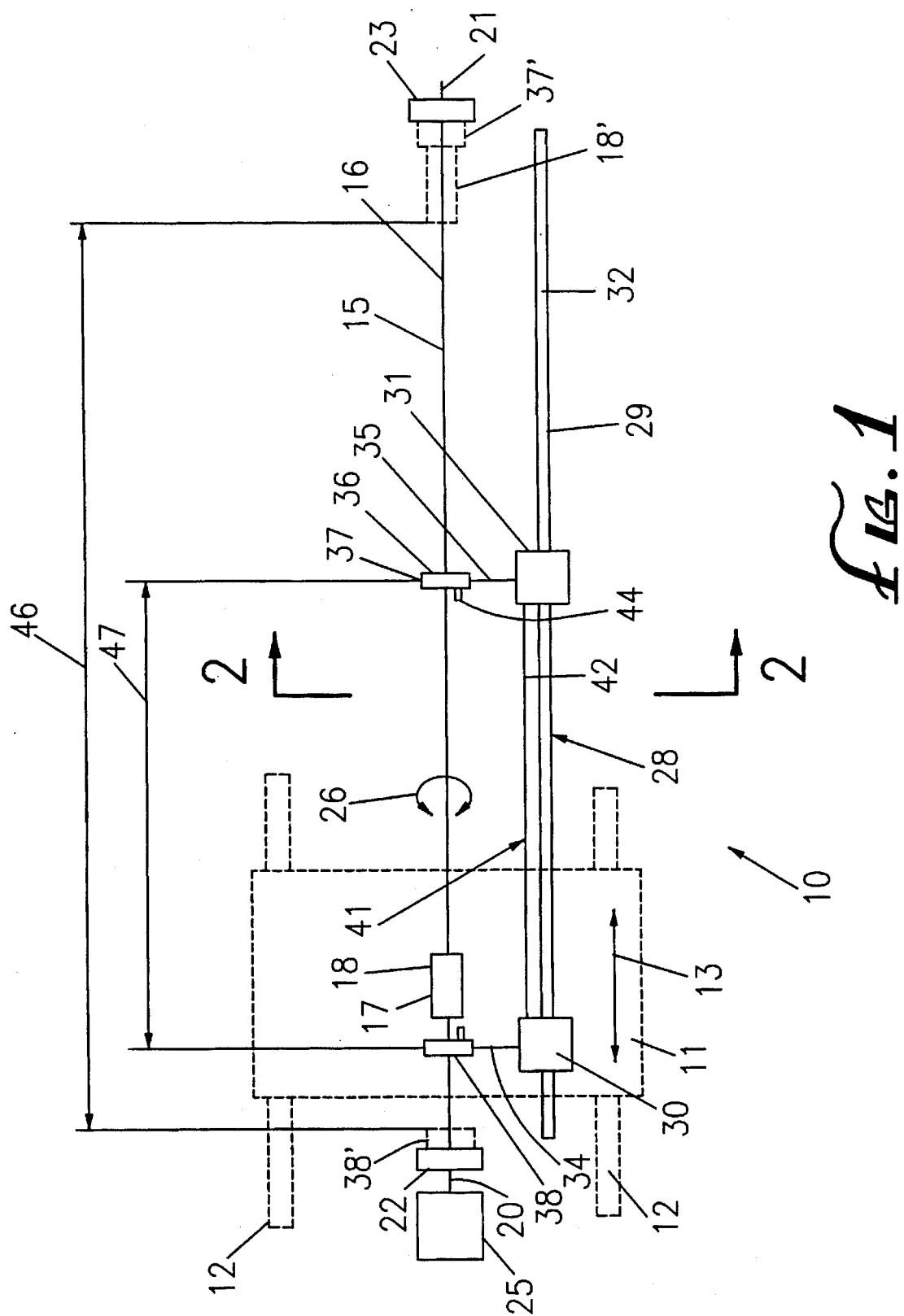
FIG. 1 shows a schematic plan view of the new machine tool; only the X-axis feed with the corresponding damping apparatus is shown, with the column merely indicated.

FIG. 1 depicts, in highly schematic fashion, a machine tool 10 that, in the example shown, is a long-bed machine tool. The machine tool 10 comprises a column 11, indicated only schematically, that is mounted on guideways 12, also indicated only schematically and partially. Column 11 can be displaced in a first axis 13, which in the exemplary embodiment shown is the X axis of the long-bed machine tool.

A spindle 15, which in this case is a lead screw 16, is provided in order to displace the column 11 along the first axis 13. The lead screw 16 is joined, by means of a nut element 17 in the form of a nut 18, to the column 11 in such a way that the latter, as a result of the rotation of the spindle 15, moves along the first axis 13.

The spindle 15 is rotatably clamped, in the region of its two outer ends 20 and 21, to two support points 22 and 23 in the form of pillow blocks. At the left outer end 20, the spindle is also joined to a drive device 25 that imparts to the spindle 15 a rotation indicated at 26.

When the spindle 15 is rotating at very high speeds, and/or when the clamped length between the two support points 22 and 23 is very long, the spindle 15 is excited by its own weight and tends to vibrate undesirably. These vibrations can build up to the extent that damage to the machine tool 10 occurs.

To prevent this, a damping apparatus designated generally as 28 is provided, which acts on the spindle 15 so as to damp or entirely prevent any vibrations.

The damping apparatus 28 comprises a guide apparatus 29 on which two guide carriages 30 and 31 are mounted displaceably along the first axis 13. This displacement capability is achieved by the fact that a guide rail 32 extending parallel to the spindle 15 is provided, on which the carriages 30 and 31 run.

Bearing elements 36 with ball bearings 37 and 38 are fastened by means of brackets 34 and 35 to the carriages 30 and 31. The two ball bearings 37 and 38 sit on either side of the nut 18 on the spindle 15, and enclose it completely. As will be explained later with reference to FIG. 2, the ball bearings 37 and 38 sit in both axially and radially displaceable fashion on spindle 15.

A spacer 41 in the form of a rod 42 is provided between the two carriages. The rod 42 holds the two carriages 30 and 31 at a specific distance from one another.

Also evident in FIG. 1 are stops 44 that are provided at bearing elements 36 and by means of which the bearing elements 36 can be brought at least temporarily into contact with the nut element 17. The arrangement is such that when the headstock 11 in FIG. 1 moves to the left, the nut element 17 drags the ball bearing 38 to the left in FIG. 1. The rod 42 thus also moves the ball bearing 37 to the left in FIG. 1. In the outermost left position in FIG. 1, the ball bearing 38 in its position labeled 38' is located almost at the left support point 22. If the column 11 now moves all the way to the right in FIG. 1 because of a corresponding rotation of the spindle 15, the nut element 17 thus comes into contact, via the stop 44, with the ball bearing 37, which ultimately reaches its farthest right position in FIG. 1 at 37'. In this position, the nut 18 is labeled 18'. The maximum displacement travel of the column 11 thus described is labeled 46 in FIG. 1. The spacing of the two ball bearings 37, 38 along the first axis 13 is labeled 47 in FIG. 1. The spacing 47 is selected so as to correspond to approximately half the displacement travel. This arrangement ensures that when one of the ball bearings 37, 38 is in an extreme end position 37' or 38', the respective other ball bearing 38, 37 is arranged approximately in the middle of the spindle 15 and there can effectively damp possible vibration of the spindle 15.

It should also be noted that the stops 44 are provided with bumpers, so that the ball bearings 37, 38 are not damaged even if the column 11 is traversed rapidly.

The manner in which the spindle 15 is damped will now be described with reference to FIG. 2, which is a sectioned depiction along the line II—II in FIG. 1. It should also be noted that although the depiction in FIG. 2 is realistic, nevertheless just as in FIG. 1 the dimensions and relations are depicted solely as examples, and in some cases are exaggerated for purposes of illustration.

Figure 2:
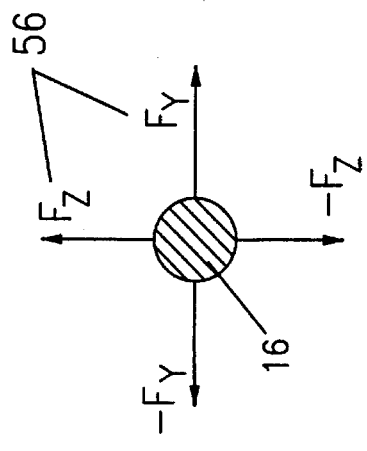
FIG. 2 shows a sectioned depiction along line II—II in FIG. 1, showing a part of the new damping apparatus in greater detail.
Figure 2:
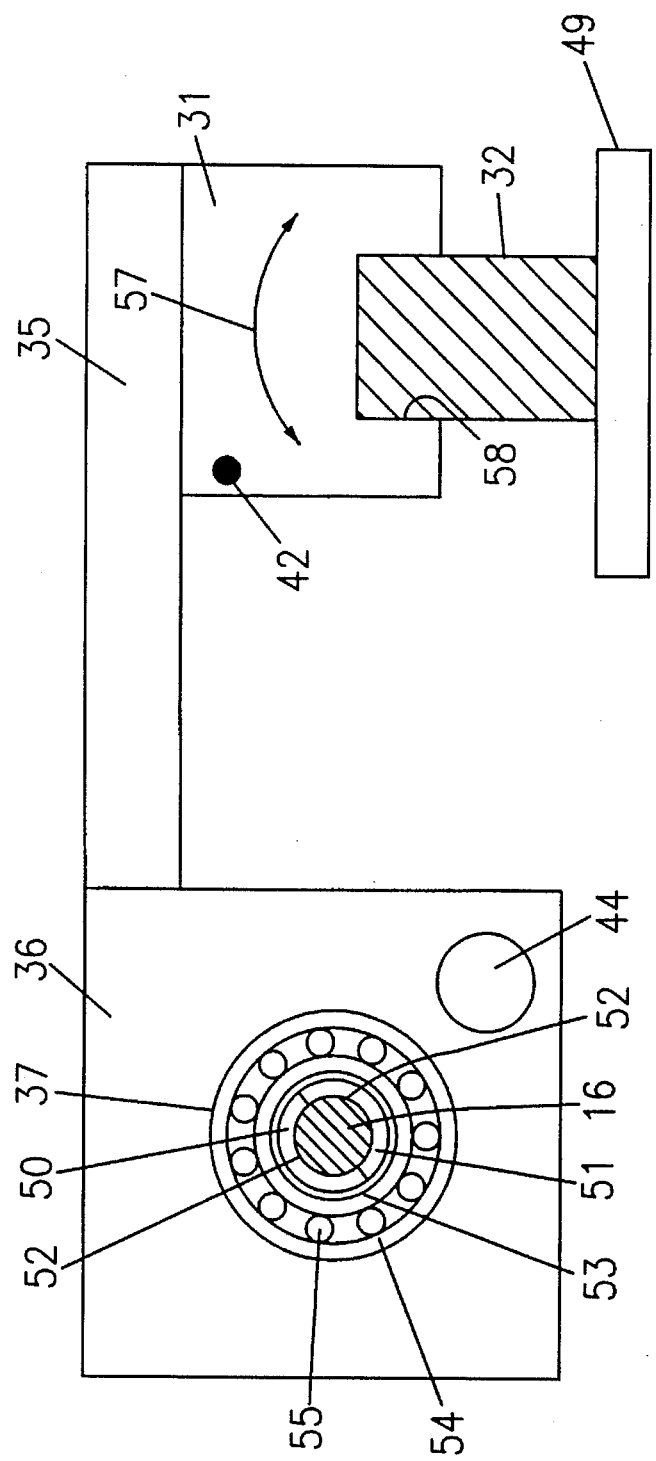

It is apparent from FIG. 2 that the guide rail 32 is fastened onto a base 49, on which the support points 22, 23 with their pillow blocks can also be fastened. Also shown is the fact that the bearing element 36 accommodates the ball bearing 37. The ball bearing 37 can either be fitted into the bearing element 36, or joined to it in a manner not shown.

The lead screw 16, shown in section, has the usual external threads (not shown for illustrative purposes), by means of which the nut 18 is displaced. Sitting on the external threads, constituting the inner cup 50, is a plastic inner ring 51 that is constructed in two parts from two bearing shells 52, and encloses the lead screw 16. The bearing shells 52 are snapped in, and sit in an inner part 53 of the otherwise commercially available ball bearing 37.

The ball bearing 37 furthermore comprises an outer part 54 fastened to the bearing element 36, which is joined by means of rolling elements 55 to the inner part 53. It is also evident that the stop 44 is arranged on the bearing element 36.

Because of the two-part design of the plastic inner ring 51, the latter can be removed at any time at a recessed area of the lead screw 16, so that in the event of a defect or wear, complete disassembly in this region of the machine tool is avoided. Moreover, the entire ball bearing 37 is lifetime-lubricated.

While the plastic inner ring 51 guarantees axial displacement of the ball bearing 37 on the lead screw 16, the ball bearing 37 itself allows radial movement between the lead screw 16 and bearing element 36. In the actual embodiment of the machine tool 10, the plastic inner ring 51 sits so it can be displaced axially and thus also to a certain extent radially, but still relatively firmly on the outer threads, so it can directly absorb forces from the spindle 15.

At the top left of FIG. 2 it is shown that the lead screw 16 exerts forces 56, via the ball bearing 37 and the bearing element 36, on the bracket 35 in such a way that a tilting moment 57 is exerted on the carriage 31 transverse to the first axis 13. The first guide carriage 31 encloses the guide rail 32 in such a way that the tilting moment 57 is absorbed by the guide rail 32.

Any forces 56 exerted by the spindle 15 transverse to the first axis 13 can always be broken down into mutually perpendicular force components $F_y$ and $F_z$. The two force components $F_y$ and $F_z$ generate portions of the tilting moment 57. As already mentioned, the plastic inner ring 51 encloses the spindle 15 in such a way that the spindle possesses essentially no clearance within the ball bearing 37. Excursions of the spindle in the Z or Y direction are therefore possible only if the guide carriage 31 can tilt transverse to the first axis 13 about the guide rail 32. This is not possible, however, because of the particular mounting of the guide carriage 31 on the guide rail 32. Although FIG. 2 shows only that the guide rail 32 is surrounded by the guide carriage in a U-shaped manner, the guide rail 32 can, however, possess a suitably profiled outer contour to which the guide carriage 31, with its guide overlap 58, is adapted so that the tilting moment is passed directly into the base 49.

Guide rails 32 and guide carriages 31 matched to one another in this manner are known as linear guidance systems, and are commercially available.

We claim:

1. A machine tool, comprising:

a column means mounted at the machine tool such that it can be displaced in at least a first axis, a spindle means extending substantially parallel to the first axis and rotatably clamped to the machine tool at support points at a first and second outer end of the spindle means, respectively, drive means connected to said spindle means for selectively rotating same about said first axis, engagement means for joining the column means to the spindle means such that the column means is displaced along the first axis when the spindle means rotates, and a damping apparatus guided on a guide apparatus running parallel to the spindle means, and acting on said spindle means between said support points for damping any vibrations of said spindle means, the damping apparatus being displaceable along the first axis at least to some extent independently from the column means, wherein the damping apparatus can be brought at least temporarily into contact with the traveling column means by means of at least one stop element, such that the column then drags the damping apparatus along.

2. A machine tool as in claim 1, wherein the spindle means is joined to the column means by means of a nut element fastened onto the column means, and wherein the damping apparatus acts on the spindle means on both sides of the nut element.

3. A machine tool as in claim 1, wherein the damping apparatus comprises at least one bearing element surrounding the spindle means.

4. A machine tool as in claim 3, wherein the bearing element is axially and radially movable with respect to the spindle means.

5. A machine tool as in claim 3, wherein the damping apparatus comprises at least two bearing elements that are spaced apart along the first axis and joined to one another by a spacer means.

6. A machine tool as in claim 1, wherein the damping apparatus comprises at least two bearing elements that are spaced apart along the first axis and joined to one another by a spacer means.

7. A machine tool as in claim 6, wherein the two bearing elements are held by the spacer means at a distance from one another that is approximately equal to half the displacement travel of the column in the first axis.

8. A machine tool as in claim 3, wherein the bearing element comprises at least one ball bearing whose inner cup comprises a two-part plastic inner ring, such that it can be dismantled.

9. A machine tool as in claim 1, wherein the damping apparatus acts on the spindle means for damping both vertical and horizontal vibrations of the spindle means.

10. A machine tool, comprising:
   a column means mounted at the machine tool such that it can be displaced in at least a first axis,
   a spindle means extending substantially parallel to the first axis and rotatably clamped to the machine tool at support points at a first and second outer end of the spindle means, respectively,
   drive means connected to said spindle means for selectively rotating same about said first axis,
   engagement means for joining the column means to the spindle means such that the column means is displaced along the first axis when the spindle means rotates, and
   a damping apparatus guided on a guide apparatus running parallel to the spindle means, and acting on said spindle means between said support points for damping any vibrations of said spindle means, the damping mechanism being displaceable along the first axis at least to some extent independently from the column means,
   wherein the damping apparatus comprises at least one bearing element surrounding the spindle means and including at least one ball bearing whose inner cup comprises a two-part plastic ring, such that it can be dismantled.

11. A machine tool as in claim 10, wherein the damping apparatus can be brought at least temporarily into contact with the traveling column means by means of at least one stop element, such that the column then drags the damping apparatus along.

12. A machine tool, comprising:
   a column means mounted at the machine tool such that it can be displaced in at least a first axis,
   a spindle means extending substantially parallel to the first axis and rotatably clamped to the machine tool at support points at a first and second outer end of the spindle means, respectively,
   drive means connected to said spindle means for selectively rotating same about said first axis,
   engagement means for joining the column means to the spindle means such that the column means is displaced along the first axis when the spindle means rotates, and
   a damping apparatus on said spindle means between said support points being displaceable along the first axis at least to some extent independently from the column means, and being guided on a guide apparatus running parallel to the spindle means,
   wherein said guide apparatus restrains lateral and tilting movement of the damping apparatus for damping both vertical and horizontal vibrations of said spindle means, and
   wherein the damping apparatus can be brought at least temporarily into contact with the traveling column means by means of at least one stop element, such that the column then drags the damping apparatus along.

* * * * *